(12) United States Patent
Han

(10) Patent No.: US 8,792,712 B2
(45) Date of Patent: Jul. 29, 2014

(54) METHOD FOR CORRECTING COLOR AND APPARATUS USING THE SAME

(75) Inventor: Jea-hee Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1146 days.

(21) Appl. No.: 12/394,239

(22) Filed: Feb. 27, 2009

(65) Prior Publication Data

US 2010/0027884 A1  Feb. 4, 2010

(30) Foreign Application Priority Data

Jul. 29, 2008 (KR) .................. 10-2008-0074087

(51) Int. Cl.
*G06K 9/00* (2006.01)
*H04N 9/67* (2006.01)
*H04N 9/77* (2006.01)

(52) U.S. Cl.
CPC ... *H04N 9/67* (2013.01); *H04N 9/77* (2013.01)
USPC .......................................... 382/168

(58) Field of Classification Search
USPC .......... 382/162, 164, 167, 168; 358/501, 518, 358/522; 348/630, 631, 672
See application file for complete search history.

(56) References Cited

U.S. PATENT DOCUMENTS 6,507,372 B1 * 1/2003 Kim ............................. 382/168
2006/0256240 A1 * 11/2006 Oka et al. ...................... 348/630

* cited by examiner

*Primary Examiner* — Duy M Dang
(74) *Attorney, Agent, or Firm* — Sughrue Mion, PLLC

(57) ABSTRACT

A method for correcting colors and an apparatus using the same are provided. A method for correcting colors includes generating a luminance histogram using an image signal; determining a color matrix corresponding to luminance information of the luminance histogram; and converting the image signal from a color space to another color space using the determined color matrix, and outputting a Red, Green, Blue (RGB) signal. Accordingly, the advantage of a reduction in color noise is achieved.

17 Claims, 4 Drawing Sheets

FIG. 4

| luminance information | COLOR MATRIX | | | emphasized color |
|---|---|---|---|---|
| 0 or 1 | 1.05761718 | -117 | 0.05664062 | High Green + Bluish |
|  | 1033 | -0.1142578 | -50 |  |
|  | -0.1269531 | 1282 | -0.125 |  |
|  | -130 | 1.25155312 | -128 |  |
|  | 0.10351562 | -211 | 1.10253906 |  |
|  | 106 | -0.2060546 | 1129 |  |
| 2 or 3 | 1.046875 | -50 | 1.0076125 | Flesh + Yellowish |
|  | 1072 | -1.0433281 | 8 |  |
|  | 0.046875 | 1107 | 0.0076125 |  |
|  | 48 | 1.06105468 | 8 |  |
|  | -0.109375 | -67 | 0.96046875 |  |
|  | -112 | 0.11425781 | 1004 |  |
| 4 or 5 | 1.048875 | -50 | 0.0078125 | Flesh + Purplish |
|  | 1072 | -0.0433281 | 8 |  |
|  | -0.078125 | 873 | -0.0136718 |  |
|  | -80 | 0.95018531 | -14 |  |
|  | 0.0625 | -67 | 1.01074218 |  |
|  | 54 | -0.0654296 | 1035 |  |
| 6 or 7 | 1.02636718 | -1 | -0.0429687 | High Blue + Greenish |
|  | 1051 | -0.0009765 | -44 |  |
|  | 0.02636718 | 1022 | -0.0429687 |  |
|  | 27 | 0.99804597 | -44 |  |
|  | -0.0371093 | 2 | 1.06054687 |  |
|  | -38 | 0.00195312 | 1086 |  |

— 410 (first color matrix block)
— 420 (second color matrix block)

METHOD FOR CORRECTING COLOR AND APPARATUS USING THE SAME

CROSS-REFERENCE TO RELATED APPLICATIONS

This application claims priority under 35 U.S.C. §119 from Korean Patent Application No. 10-2008-0074087, filed on Jul. 29, 2008, in the Korean Intellectual Property Office, the disclosure of which is incorporated herein by reference in its entirety.

BACKGROUND OF THE INVENTION

1. Field of the Invention

Apparatuses and methods consistent with the present invention relate to a method for correcting color and an apparatus using the same, and more particularly, to an apparatus which corrects color dynamically according to an input signal and a method thereof.

2. Description of the Related Art

Digital image apparatuses which reproduce color, such as monitors, scanners, or televisions (TVs), provide high quality images and a wide range of functions in order to satisfy various requirements of a user. The digital image apparatuses output the original colors of an input image, or emphasize specific colors among the colors of an input image. In doing so, a user can view an image in its natural colors.

However, if a specific color of the above image is stronger than the others, color noise may occur. For example, if a digital image apparatus broadcasts a sports match, a green color such as the color of a grassy field or woods may be prominently displayed. In this case, if the input image is changed to have a low luminance, the green color remains strong, and thus the other colors may appear somewhat greenish.

Although a user may desire to view an image having harmonious colors by emphasizing a specific color, the user may not be able to view a high quality image due to the varied luminance of the image.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a method for correcting color dynamically, in which luminance of an image varies, a different color matrix is applied according to the luminance variation, and thus a color space is converted, and a color correction apparatus.

The present invention also provides a method for correcting dynamically a color to provide natural image by solving problems caused by color noise, and a color correction apparatus.

According to an exemplary aspect of the present invention, there is provided a method for correcting a color, including generating a luminance histogram using an image signal; determining a color matrix corresponding to luminance information of the luminance histogram; and converting the image signal from a color space to another color space using the determined color matrix, and outputting a Red, Green, Blue (RGB) signal.

The determining may include determining a color matrix which is provided differently according to the luminance information.

The image signal may be one of a YUV signal and a YCbCr signal.

The image signal may be input in a frame unit or a field unit.

The determining may include determining a color matrix to be different from a previous color matrix if a difference between current luminance information and previous luminance information exceeds a predetermined value; and determining a color matrix to be identical to a previous color matrix if a difference between current luminance information and previous luminance information is less than a predetermined value.

The luminance information may include a maximum luminance value of the luminance histogram.

The determining may include determining a color matrix to be different from a previous color matrix if current luminance information differs from previous luminance information; and determining a color matrix to be identical to a previous color matrix if current luminance information is same as previous luminance information.

The luminance information may correspond to a specific range comprising a maximum luminance value of the luminance histogram.

According to an exemplary aspect of the present invention, there is provided a color correction apparatus, including a luminance histogram generator which generates a luminance histogram using an image signal; a color matrix determination unit which determines a color matrix corresponding to luminance information of the luminance histogram; and a color space conversion unit which converts the image signal from a color space to another color space using the determined color matrix, and outputs a Red, Green, Blue (RGB) signal.

The color matrix determination unit may determine a color matrix which is provided differently according to the luminance information.

The image signal may be one of a YUV signal and a YCbCr signal.

The image signal may be input in a frame unit or a field unit.

If a difference between current luminance information and previous luminance information exceeds a predetermined value, the color matrix determination unit may determine a color matrix to be different from a previous color matrix.

The luminance information may include a maximum luminance value of the luminance histogram.

If current luminance information differs from previous luminance information, the color matrix determination unit may determine a color matrix to be different from a previous color matrix.

The luminance information may correspond to a specific range comprising a maximum luminance value of the luminance histogram.

The apparatus may further include a storage unit which stores a plurality of color matrixes, wherein the color matrix determination unit retrieves the determined color matrix from the storage unit, and transmits the retrieved color matrix to the color space conversion unit.

BRIEF DESCRIPTION OF THE DRAWINGS

The above and/or other aspects of the present invention will be more apparent by describing certain exemplary embodiments of the present invention with reference to the accompanying drawings, in which:

FIG. 4 is a color matrix which is used in a second color space converter according to luminance information according to an exemplary embodiment of the present invention.

DETAILED DESCRIPTION OF EXEMPLARY EMBODIMENTS OF THE INVENTION

Figure 1:
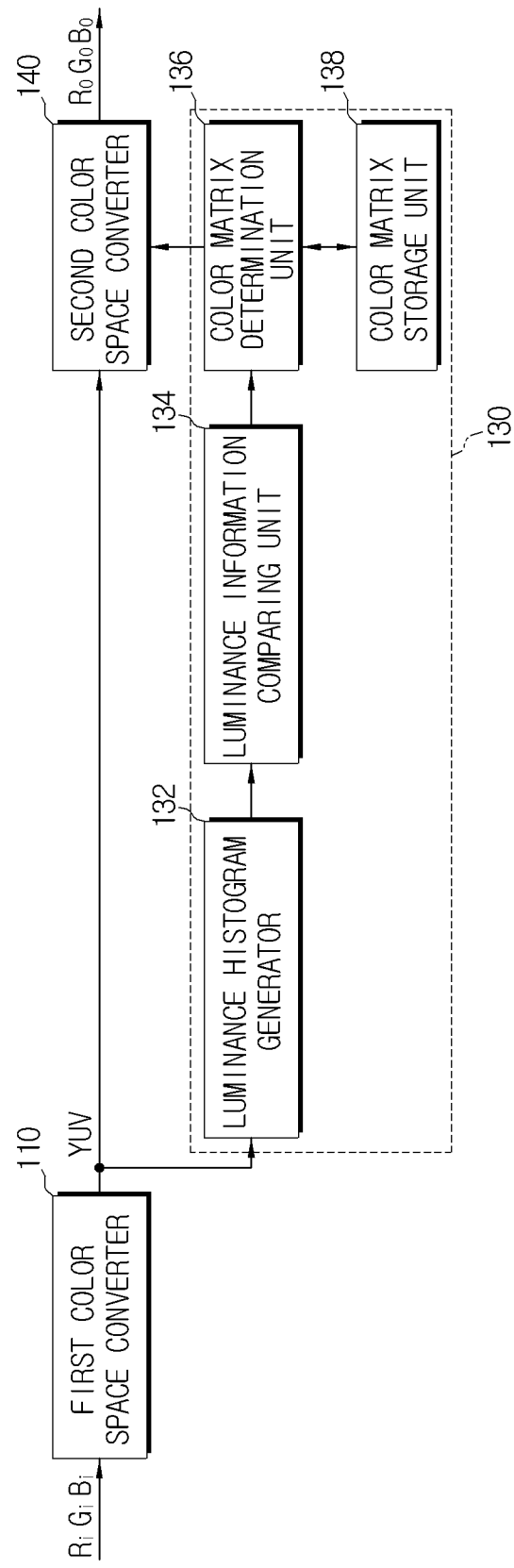
FIG. 1 is a block diagram illustrating a color correction apparatus according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram illustrating a color correction apparatus according to an exemplary embodiment of the present invention. The color correction apparatus is provided in a digital image apparatus. The color correction apparatus may comprise a first color space converter 110, a color correction unit 130, and a second color space converter 140.

If an image signal consisting of Red, Green, Blue (RGB) colors, that is an RGB signal, is input, the first color space converter 110 converts the RGB signal into a YWV signal using a color matrix. If an RGB signal is input, it is difficult to correct the RGB signal. Accordingly, an RGB signal may be converted into a YUV signal. The image signal may be input in a frame unit.

The color correction unit 130 extracts luminance information from the YUV signal and determines a color matrix adaptive to the luminance information. The color correction unit 130 may comprise a luminance histogram generator 132, a luminance information comparing unit 134, a color matrix determination unit 136, and a color matrix storage unit 138.

The luminance histogram generator 132 generates a luminance histogram using a luminance signal from a YUV signal, extracts luminance information, and transmits the extracted luminance information to the luminance information comparing unit 134. Herein, the luminance histogram represents a luminance distribution of pixels of an image signal as a graph analyzing intensity of an image signal having light and dark pixels.

The luminance information may be represented as a predetermined level including the maximum luminance value in the luminance histogram. If frames have the same luminance information, it may be determined that the luminance variation between the frames is small, and if frames have different luminance information, it may be determined that the luminance variation between the frames is significant.

The luminance information comparing unit 134 compares luminance information of a current frame transmitted from the luminance histogram generator 132 with luminance information of a previous frame, and transmits the result to the color matrix determination unit 136.

The color matrix determination unit 136 retrieves a color matrix corresponding to luminance information transmitted from the luminance information comparing unit 134 from the color matrix storage unit 138, and transmits the retrieved color matrix to the second color space converter 140.

Specifically, if luminance information of a current frame is different from that of a previous frame, the color matrix determination unit 136 retrieves a color matrix different from a color matrix used in the previous frame from the color matrix storage unit 138, and transmits the retrieved color matrix to the second color space converter 140. On the other hand, if luminance information of a current frame is the same as that of a previous frame, the color matrix determination unit 136 retrieves a color matrix used in the previous frame from the color matrix storage unit 138, and transmits the retrieved color matrix to the second color space converter 140. When luminance information of a current frame is the same as that of a previous frame, it may not be necessary for the color matrix determination unit 136 to retrieve a color matrix identical to the color matrix used in the previous frame and transmits the retrieved color matrix to the second color space converter 140, since the second color space converter 140 can convert color data of the current frame using the color matrix used in the previous frame.

The color matrix storage unit 138 stores a plurality of color matrixes. The color matrixes may be pre-stored by a fabricator of the color correction apparatus.

The second color space converter 140 converts a YUV signal on a YUV color space to an RGB signal on an RGB color space, and outputs the RGB signal. The second color space converter 140 uses a color matrix transmitted from the color matrix determination unit 136 when outputting an RGB signal. The color matrix used in the second color space converter 140 may be the same as or different from that of the first color space converter 110.

Figure 2:
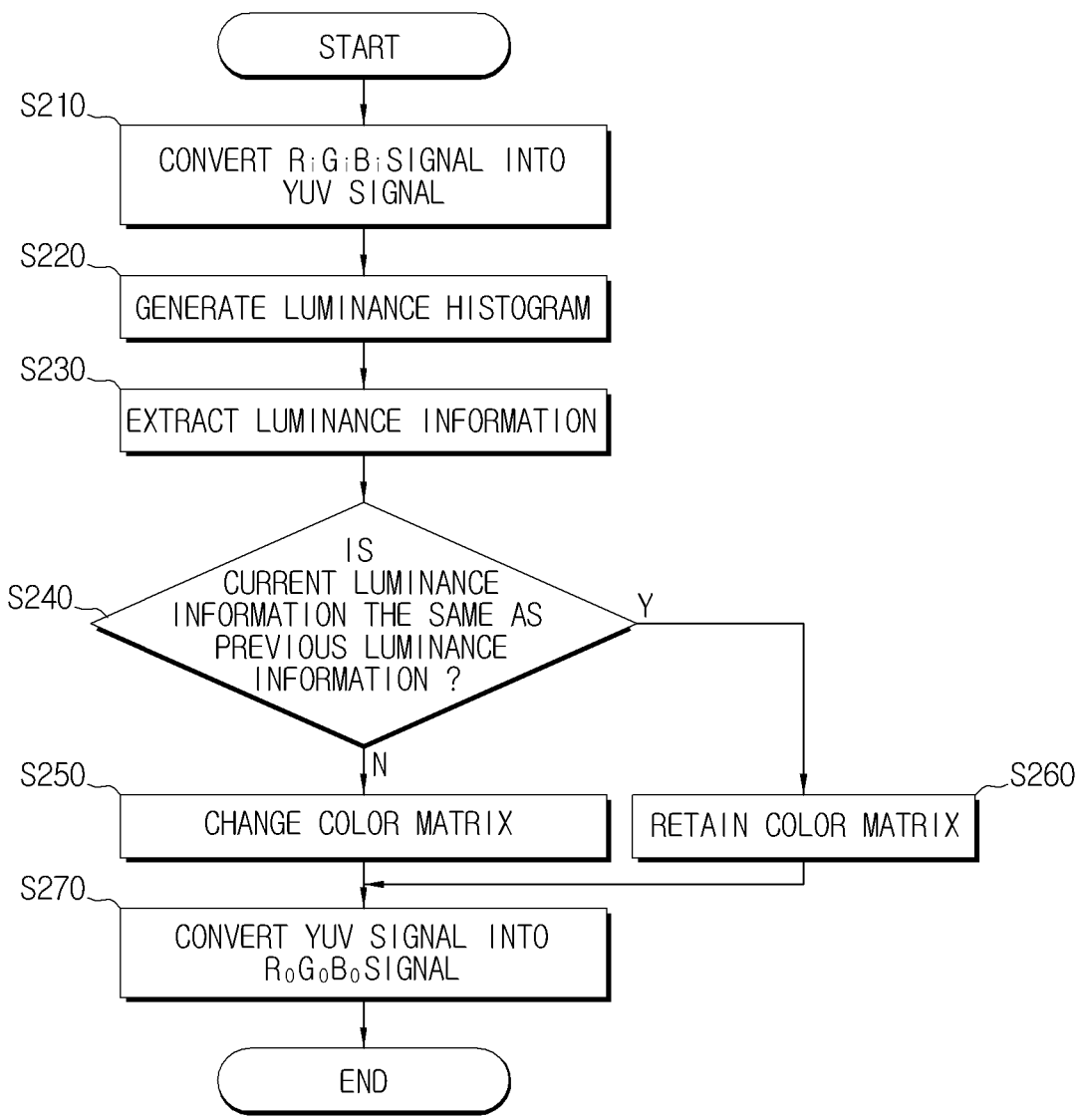
FIG. 2 is a flowchart provided to explain a method for correcting colors adaptively according to the luminance variation according to an exemplary embodiment of the present invention.

FIG. 2 is a flowchart provided to explain a method for correcting colors adaptively according to the luminance variation according to an exemplary embodiment of the present invention.

If an RGB signal is input in a frame unit, the first color space converter 110 converts an RGB signal into YUV signal (S210). The converted YUV signal is transmitted not only to the second color space converter 140 but also to the color correction unit 130.

The luminance histogram generator 132 of the color correction unit 130 generates a luminance histogram using a luminance signal from the YUV signal (S220), and transmits luminance information acquired from the luminance histogram to the luminance information comparing unit 134 (S230). The luminance information may be a level including the maximum luminance value in the luminance histogram.

The luminance information comparing unit 134 compares incoming luminance information with existing luminance information, and determines whether the two are the same (S240). The incoming luminance information may be luminance information of a current frame, and the existing luminance information may be luminance information of a previous frame. If the incoming luminance information and the existing luminance information differ from each other, it is determined that luminance between frames has changed significantly.

If it is determined that the incoming luminance information and the existing luminance information differ from each other (S240-N), the color matrix determination unit 136 retrieves a color matrix corresponding to the changed luminance information from the color matrix storage unit 138, and transmits the color matrix to the second color space converter 140

(S250). The retrieved color matrix differs from the color matrix used in the previous frame.

If it is determined that the incoming luminance information is the same as the existing luminance information (S240-Y), the color matrix determination unit 136 retrieves a color matrix identical to that of the previous frame, and transmits the color matrix to the second color space converter 140 (S260).

The second color space converter 140 converts a YUV signal from one color space to another color space using a color matrix transmitted from the color matrix determination unit 136, and outputs an RGB signal (S270).

If luminance is varied as described above, a color matrix which converts a color space from a YUV signal to an RGB signal is also changed, and thus the advantage of a reduction in color noise is obtained.

Figure 3:
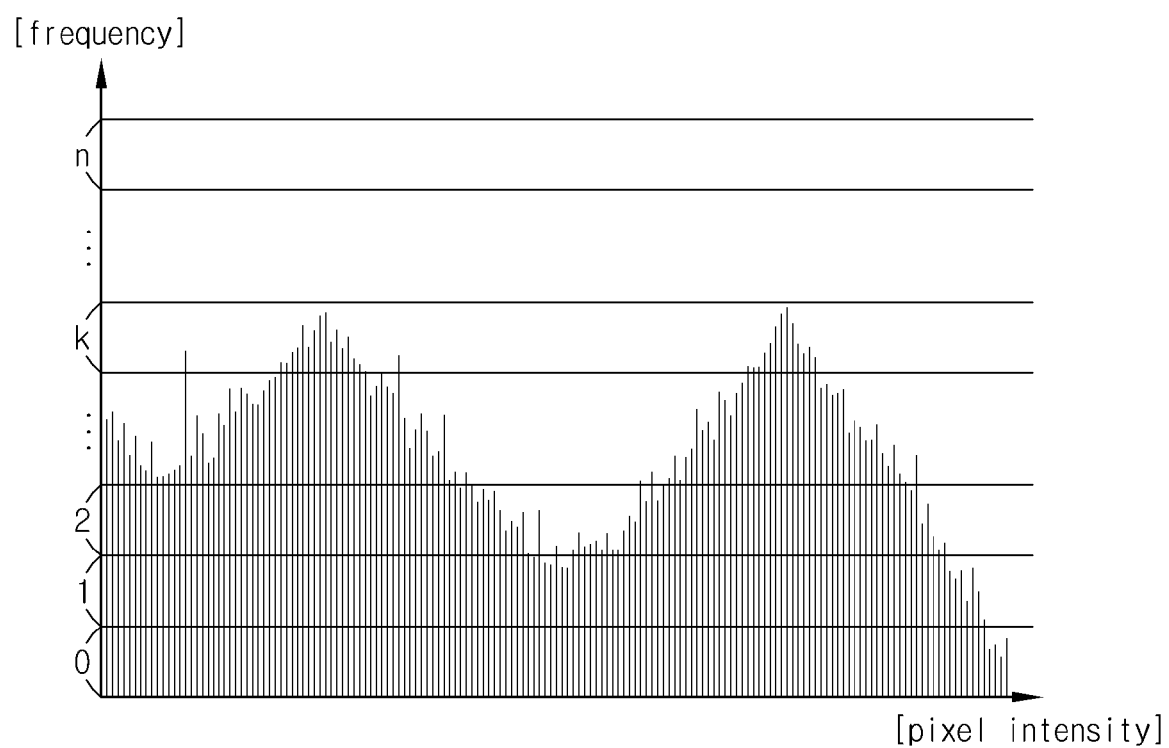
FIG. 3 is a luminance histogram according to an exemplary embodiment of the present invention.

FIG. 3 is a luminance histogram according to an exemplary embodiment of the present invention.

The luminance histogram generator 132 generates a luminance histogram using an image signal input in a frame unit. Luminance information is determined with reference to the maximum luminance value. Referring to FIG. 3, the luminance histogram provides luminance information k. In an exemplary embodiment, the maximum luminance value is the highest frequency in the luminance histogram. In FIG. 3, the luminance information k corresponds to a frequency range where the highest frequency is located.

FIG. 4 is a color matrix which is used in a second color space converter according to luminance information according to an exemplary embodiment of the present invention.

Referring to FIG. 4, luminance information is classified from 0 to 7. For luminance information of 0 or 1, a first color matrix 410 is used, and an RGB signal converted from a YUV signal is provided, in which a dark green and bluish colors are emphasized. For luminance information of 2 or 3, a second color matrix 420 is used, and an RGB signal converted from a YUV signal is provided, in which flesh colors and yellowish colors are emphasized.

According to this exemplary embodiment of the present invention, when a YUV signal is converted into an RGB signal, a color matrix corresponding to luminance information of a luminance histogram is used. However, this is merely an exemplary embodiment of the present invention. Alternatively, when a YCbCr signal is converted into an RGB signal, a color matrix corresponding to luminance information may also be used.

While an image signal is input in a frame unit according to this exemplary embodiment of the present invention, this should not be considered limiting. When an image signal is input in a field unit, a color matrix dynamically changing according to luminance information of a luminance histogram may be used.

According to this exemplary embodiment of the present invention, luminance information is set to a luminance value including a specific range of luminance, and if luminance information is changed, the color matrix is also changed and thus a color space is converted. However, this should not be considered limiting. Alternatively, the luminance information may be a luminance value itself, and if difference between previous luminance information and current luminance information is more than a specific value, the color matrix may also be changed.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for correcting color, comprising:
   generating a luminance histogram from an image signal in a first color space;
   determining a color matrix based on luminance information of the luminance histogram; and
   converting the image signal from the first color space to an image signal in a second color space, different from the first color space, using the determined color matrix, wherein the second color space is a Red, Green, Blue (RGB) color space,
   wherein the determining comprises:
   if a difference between current luminance information and previous luminance information exceeds a predetermined value, determining the color matrix to be different from a previous color matrix.

2. The method of claim 1, wherein the determining further comprises:
   when the luminance information is first luminance information, determining a first color matrix, and when the luminance information is second luminance information, different from the first luminance information, determining a second color matrix, different from the first color matrix.

3. The method of claim 1, wherein the first color space is one of a YUV color space and a YCbCr color space.

4. The method of claim 1, wherein the image signal in the first color space is input in frame units or field units.

5. The method of claim 1, wherein the determining further comprises:
   if a difference between current luminance information and previous luminance information is less than a predetermined value, determining the color matrix to be identical to the previous color matrix.

6. The method of claim 5, wherein the current luminance information comprises a maximum luminance value of the luminance histogram.

7. The method of claim 6, wherein the maximum luminance value indicates a highest frequency in the luminance histogram.

8. The method of claim 1, wherein the determining further comprises:
   if current luminance information differs from previous luminance information, determining the color matrix to be different from a previous color matrix; and
   if current luminance information is same as previous luminance information, determining the color matrix to be identical to the previous color matrix.

9. The method of claim 8, wherein the current luminance information corresponds to a specific range comprising a maximum luminance value of the luminance histogram.

10. The method of claim 9, wherein the maximum luminance value indicates a highest frequency in the luminance histogram and the specific range is a specific frequency range.

11. A color correction apparatus, comprising:
    a luminance histogram generator which generates a luminance histogram from an image signal in a first color space;
    a color matrix determination unit which determines a color matrix based on luminance information of the luminance histogram; and
    a color space conversion unit which converts the image signal from the first color space to an image signal in a second color space, different from the first color space, space using the determined color matrix, wherein the second color space is a Red, Green, Blue (RGB) color space, wherein, if a different between current luminance information and previous luminance information exceeds a predetermined value, the color matrix determination unit determines the color matrix to be different from a previous color matrix.

12. The apparatus of claim 11, wherein:

when the luminance information is first luminance information, the color matrix determination unit determines a first color matrix, and when the luminance information is second luminance information, different from the first luminance information, the color matrix determination unit determines a second color matrix, different from the first color matrix.

13. The apparatus of claim 11, wherein the first color space is one of a YUV color space and a YCbCr color space.

14. The apparatus of claim 11, wherein the image signal in the first color space is input in frame units or field units.

15. The apparatus of claim 11, wherein the current luminance information comprises a maximum luminance value of the luminance histogram.

16. The apparatus of claim 11, wherein if current luminance information differs from previous luminance information, the color matrix determination unit determines the color matrix to be different from a previous color matrix.

17. The apparatus of claim 11, further comprising:

a storage unit which stores a plurality of color matrixes, wherein the color matrix determination unit retrieves the determined color matrix from the storage unit, and transmits the retrieved color matrix to the color space conversion unit.

* * * * *